US010066392B2

(12) United States Patent
Miller et al.

(10) Patent No.: US 10,066,392 B2
(45) Date of Patent: *Sep. 4, 2018

(54) ONE HOUR FIRE RATED WOODEN FRAME MEMBERS USING LIGHTWEIGHT GYPSUM WALLBOARD

(71) Applicant: UNITED STATES GYPSUM COMPANY, Chicago, IL (US)

(72) Inventors: Gary Franklin Miller, Palatine, IL (US); Joseph Edward Swinea, Mundelein, IL (US); Naveen Punati, Arlington Heights, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,612

(22) Filed: Mar. 22, 2017

(65) Prior Publication Data
US 2018/0087270 A1    Mar. 29, 2018

Related U.S. Application Data

(60) Provisional application No. 62/401,452, filed on Sep. 29, 2016.

(51) Int. Cl.
*E04B 9/04*        (2006.01)
*E04B 1/26*        (2006.01)
(Continued)

(52) U.S. Cl.
CPC ............... *E04B 9/04* (2013.01); *C04B 20/06* (2013.01); *C04B 28/14* (2013.01); *E04B 1/26* (2013.01);
(Continued)

(58) Field of Classification Search
CPC . E04B 1/26; E04B 1/7654; E04B 1/94; E04B 9/001; E04B 9/04; E04B 1/945; E04C 3/16; C04B 20/06; C04B 28/14
See application file for complete search history.

(56) References Cited

U.S. PATENT DOCUMENTS 1,675,226 A    6/1928 Munroe et al.
1,791,278 A    2/1931 Lucy
(Continued)

FOREIGN PATENT DOCUMENTS

DE    19714625 A1    10/1988
GB    2395728 A      6/2004
GB    2420355 A      5/2006

OTHER PUBLICATIONS

Knauf Gips KG, "K25.de Knauf Fireboard Beam and Column Encasements", System Data Sheet Catalog, Jun. 1, 2013 edition, retrieved Dec. 3, 2015 <http://www.wego-systembaustoffe.de/shopware_wego_static/pdf/vti/technishes_datenblatt/knf/k25_englisch.pdf>.

(Continued)

*Primary Examiner* — James M Ference
(74) *Attorney, Agent, or Firm* — Greer, Burns & Crain, Ltd.; Pradip K. Sahu; Philip T. Petti

(57) ABSTRACT

A combined wooden frame support and ceiling system is provided, each support including upper and lower wooden chords and a wooden structure connecting the lower chord to the upper chord for weight bearing purposes. A gypsum wallboard batten strip is attached to the lower chord, and defining a ledge extending from each side of the lower chord. A single thickness of gypsum wallboard panels is used to create a ceiling attached to the support, each panel used to create the ceiling is made from a slurry composition including less than 5% by weight of Grade 4 vermiculite. Upon the support being assembled in the ceiling system, (Continued)

with a plurality of the supports, and having lengths of insulation supported by the ledges of the adjacent supports, the ceiling system resists charring by fire for at least one hour.

12 Claims, 4 Drawing Sheets

(51) Int. Cl.
| | | |
|---|---|---|
| E04B 1/76 | (2006.01) | |
| E04B 1/94 | (2006.01) | |
| E04B 9/00 | (2006.01) | |
| C04B 28/14 | (2006.01) | |
| C04B 20/06 | (2006.01) | |
| E04C 3/16 | (2006.01) | |

(52) U.S. Cl.
CPC .............. *E04B 1/7654* (2013.01); *E04B 1/94* (2013.01); *E04B 1/945* (2013.01); *E04B 9/001* (2013.01); *E04C 3/16* (2013.01)

(56) References Cited

U.S. PATENT DOCUMENTS

| | | | |
|---|---|---|---|
| 2,097,722 A | | 11/1937 | Coddington |
| 2,526,066 A | | 10/1950 | Croce |
| 2,744,022 A | | 5/1956 | Croce et al. |
| 3,686,819 A | * | 8/1972 | Atkinson ............... E04B 5/29 52/693 |
| 3,913,290 A | * | 10/1975 | Billing ................... E04B 1/943 52/347 |
| 4,033,081 A | | 7/1977 | Perkins, Jr. |
| 4,266,384 A | * | 5/1981 | Orals ..................... E04B 9/22 52/407.1 |
| 4,564,544 A | | 1/1986 | Burkard et al. |
| 4,669,243 A | * | 6/1987 | Gore ...................... E04C 3/292 52/376 |
| 4,862,662 A | * | 9/1989 | Eberle ................... E04B 5/12 52/299 |
| 5,058,352 A | * | 10/1991 | Loiselle ................ E04B 1/7654 52/404.2 |
| 5,592,800 A | * | 1/1997 | Koo ....................... E04C 3/292 52/692 |
| 5,761,872 A | * | 6/1998 | Sanford ................. E04C 3/16 52/694 |
| 5,791,109 A | | 8/1998 | Lehnert et al. |
| 6,054,088 A | | 4/2000 | Alhamad |
| 6,251,979 B1 | * | 6/2001 | Luongo .................. B28B 11/24 524/423 |
| 6,319,312 B1 | * | 11/2001 | Luongo .................. C04B 14/18 106/672 |
| 6,340,388 B1 | * | 1/2002 | Luongo .................. B28B 11/24 106/675 |
| 6,616,804 B2 | | 9/2003 | Foster et al. |
| 8,702,881 B2 | | 4/2014 | Yu et al. |
| 8,974,925 B1 | * | 3/2015 | Cao ........................ E04B 1/94 428/294.7 |
| 9,322,167 B2 | | 4/2016 | Campbell-Lloyd |
| 9,422,714 B2 | | 8/2016 | Miller |
| 2003/0079425 A1 | * | 5/2003 | Morgan ................. E04B 2/7411 52/232 |
| 2004/0028956 A1 | * | 2/2004 | Savoly ................... B28B 19/0092 428/703 |
| 2004/0045234 A1 | * | 3/2004 | Morgan ................. E04B 2/7411 52/232 |
| 2004/0152379 A1 | * | 8/2004 | McLarty, III ......... B28B 19/0092 442/42 |
| 2004/0176004 A1 | * | 9/2004 | Fyfe ....................... C09D 5/18 442/138 |
| 2005/0263925 A1 | * | 12/2005 | Heseltine .............. C03C 13/001 264/109 |
| 2008/0087366 A1 | * | 4/2008 | Yu .......................... C04B 28/14 156/39 |
| 2009/0075051 A1 | * | 3/2009 | Fyfe ....................... E04B 1/944 428/297.4 |
| 2009/0107059 A1 | * | 4/2009 | Kipp ...................... C04B 28/26 52/144 |
| 2009/0107072 A1 | * | 4/2009 | Bowman ................ E04B 1/26 52/404.1 |
| 2014/0000196 A1 | * | 1/2014 | Daniels .................. E06B 3/822 52/232 |
| 2015/0104629 A1 | * | 4/2015 | Cao ........................ C04B 28/14 428/220 |
| 2015/0125683 A1 | * | 5/2015 | Cao ........................ C04B 28/14 428/219 |
| 2016/0138264 A1 | | 5/2016 | Kragness et al. |
| 2016/0168026 A1 | | 6/2016 | Moore et al. |
| 2016/0230382 A1 | * | 8/2016 | Vermeren ............... B32B 7/14 |
| 2016/0230385 A1 | * | 8/2016 | O'Neil .................... B32B 5/06 |

OTHER PUBLICATIONS

PCT Search Report from International Patent Application No. PCT/US2015/050351, dated Dec. 10, 2015.

* cited by examiner

ONE HOUR FIRE RATED WOODEN FRAME MEMBERS USING LIGHTWEIGHT GYPSUM WALLBOARD

RELATED APPLICATION

This application claims 35 USC 119 priority from U.S. Provisional Application No. 62/401,452 filed Sep. 29, 2016.

BACKGROUND

The present invention relates generally to wooden frame construction materials and techniques, and more specifically to enhancing fire resistance in wooden frame members used in construction.

Since their introduction in about 1960, light timber, open-web wood trusses have become one of the most widely used engineered wood building products employed in commercial construction. According to the Wood Truss Council of America (WTCA), such trusses are lightweight, easy to install, and have nailable chords for easy attachment of roof decking and ceiling materials. Open-webbing provides great benefits to plumbers and electricians, without the need to spend time cutting holes in floor members. Less cutting reduces jobsite labor and reduces potentially critical errors that could result in compromising the structural integrity of the components. Open-web wood trusses are lighter, less expensive and can be stronger than large, single "closed web" support members.

When subject to fire damage, the weak link or cause of failure of such open-web trusses is the detachment of the metal gusset plates used to connect the framing members together. Under load, as the wood chars and the metal gusset plates heat up under fire, the teeth of the metal gusset plates lose strength and holding power. The loss of the gusset plate on the bottom chord of a truss can lead to tensile forces pulling the truss apart. The loss of a gusset plate on the top chord will cause any web members attached to the top chord to pull away. Both situations will significantly reduce the load-carrying capacity of the installed truss and may even lead to a truss collapse.

Thus, engineered building components provide adequate strength under normal loading, but under fire conditions, these truss systems can fail, leading to the collapse of roof, floors, and possibly the entire structure. Truss systems are usually hidden, and fires within truss systems can go undetected for long periods of time, resulting in loss of structural integrity prior to discovery of the fire. Structural design codes often do not factor in the decreased system integrity as the fire degrades the structural members.

A suitable approach to enhancing fire resistance to wood trusses is described in commonly-assigned U.S. Pat. No. 9,422,714 which is incorporated by reference. In that patent, the focus is on obtaining a 2-hour fire rating for a wooden truss. However, many jurisdictions have a 1-hour fire rating. In addition, there is a trend in the industry to provide relatively lightweight building panels for ceiling construction. The lighter weight panels are easier for contractors to handle and install than conventional wallboard panels. However, the newer lighter weight panels have different fire-resistant properties.

While gypsum wallboard panels have long been known to retard the progress of fire in a building, one drawback of conventional panels is that, when exposed to intense heat, the remaining moisture in the set panels calcines, causing the panels to shrink. U.S. Pat. Nos. 2,526,066 and 2,744,022 discuss the use of comminuted unexfoliated vermiculate and mineral and glass fibers in proportions sufficient to inhibit the shrinkage of gypsum panels under high temperature conditions. Both references, however, relied on a high density core to provide sufficient gypsum to act as a heat sink. They disclose the preparation of ½-inch-thick gypsum panels with a weight of, 2 to 2.3 pounds per square foot (2,000 to 2,300 pounds per thousand square feet ("lb/msf")) and board densities of about 50 pounds per cubic foot ("pcf") or greater.

It is noted that in the absence of water resistant additives, when immersed in water, set gypsum can absorb water up to 50% of its weight. When gypsum panels—including fire resistant gypsum panels—absorb water, they can swell, become deformed and lose strength which may degrade their fire-resistance properties. Low weight fire-resistant panels have far more air and/or water voids than conventional, heavier fire-resistant panels. These voids would be expected to increase the rate and extent of water uptake, with the expectation that such low weight fire-resistant panels would be more water absorbent than conventional heavier fire-resistant panels.

Accordingly, there is a need for open-web truss systems having enhanced fire resistance while employing the lighter weight ceiling panels.

SUMMARY

The above-identified need is met by the present wooden support assembly, provided in either the form of an open web wooden truss or a wooden "I"-beam in which approximately six-inch wide gypsum wallboard batten strips are attached to a lower surface of the lower chord of the support. The width of the strip compared to the approximate 4-inch width of the chord means that the wallboard batten strips extend laterally beyond edges of the chord. In this manner, a fire resistant barrier is created that protects both the chord from charring, and the metal gusset plates from degrading due to the intense heat generated by the fire.

In addition, the batten strips also provide a ledge of approximately 1 inch extending away from, and along each edge of the chord, creating a support platform for insulation installed prior to the fabrication of the wallboard ceiling. It has been found that a ceiling made from trusses equipped with the present batten strips, and having a ceiling of a single layer of a specially formulated lightweight ⅝-inch gypsum wallboard panel fastened to the strips, successfully resisted charring by fire for the required one hour per UL 263/ASTM E119.

A preferred construction ceiling system using the present truss includes the support with the batten strip along the lower chord, insulation strips inserted between trusses and supported by the ledges defined by the batten strips, then resilient sound attenuation channels secured transversely to the batten strips, so that the batten strips are acoustically decoupled from the wallboard ceiling boards attached to the resilient channels. The gypsum wallboard ceiling panels or boards are then secured to the resilient channels, as is well known in the art. Preferably a single thickness of lightweight gypsum wallboard ceiling panel is attached to the resilient channels.

The present ceiling system is preferably constructed using specially formulated lightweight gypsum wallboard panels having a weight of approximately, and preferably no more than 1800 pounds per 1,000 square feet, referred in the industry as 1800 lbs/msf. In contrast, conventional ⅝-inch gypsum wallboard panels, of the type disclosed in U.S. Pat. No. 9,422,714, weigh 2500 lbs/msf. When conventional 2500 lbs/msf gypsum wallboard panels are exposed to fire, the set gypsum calcines and causes the panels to shrink, enlarging gaps between adjacent panels and more rapidly exposing supporting structures to fire. It has been found that when the present lightweight panels are formulated using Grade 4 vermiculite, the panels expand during a fire, which closes gaps between adjacent panels and thus retards the spread of the fire. Thus, despite the use of lightweight panels, which have a shorter fire retarding duration, by including the designated amount of vermiculite in the formulation, the ceiling panels expand sufficiently and prevent the progression of the fire to the extent that a 1-hour fire rating is achieved using a single layer wallboard panel as the ceiling.

It was further found that depending on the amount of vermiculite in the formulation, in some cases, the single wallboard panel layer forming the ceiling could expand when exposed to fire to the extent that the panels detached from their fasteners, and collapsed during the fire test, exposing the trusses to more rapid destruction by fire. An important feature of the present ceiling assembly is that the lightweight gypsum panels are formulated with less than 5% Grade 4 vermiculite by weight. Unexpectedly, this amount of Grade 4 vermiculite creates sufficient expansion during fire tests to close gaps between adjacent panels, without causing unwanted separation of the panels from the ceiling assembly.

More specifically, a combined wooden frame support with enhanced fire resistance and ceiling system including a plurality of the supports mounted in spaced parallel relation to each other is provided, each support including an upper wooden chord extending along a longitudinal axis, a lower wooden chord disposed below the upper chord and extending along a vertically displaced, parallel axis, a wooden structure connecting the lower chord to the upper chord for weight bearing purposes. At least one gypsum wallboard batten strip is attached directly to an underside of the lower chord, the strip being dimensioned to have a width in the general range of 6-8 inches to define a ledge extending from each side of the lower chord, such that a space is defined between ledges of adjacent supports, and enhanced fire resistance is provided by the batten strip being attached to the lower chord.

The batten strip is a separate component from a single thickness of gypsum wallboard panels used to create a ceiling attached to the support. Each gypsum wallboard panel used to create the ceiling is made from a wallboard slurry composition including less than 5% by weight of Grade 4 vermiculite. Upon the support being assembled in the ceiling system, with a plurality of the supports, and having lengths of insulation supported by the ledges formed by the gypsum wallboard batten strips of the adjacent supports, the ceiling system resists charring by fire for at least one hour.

In another embodiment, a ceiling system is provided, including a plurality of wooden frame trusses with enhanced fire resistance, each truss including an upper wooden chord extending along a longitudinal axis, a lower wooden chord disposed below the upper chord and extending along a vertically displaced, parallel axis, a plurality of wooden supports being attached between the upper and lower chords. A plurality of metal gusset plates secures the supports to the chords. At least one gypsum wallboard batten strip is attached directly to an underside of the lower chord, each gypsum wallboard batten strip being constructed and arranged so that the gypsum wallboard batten strip defines a ledge extending from each side of the lower chord.

At least one length of insulation is inserted between adjacent trusses, being placed upon and supported by the ledges such that the length of insulation extends between adjacent trusses. At least one resilient strip is secured to an underside of each wallboard batten strip.

A single layer of gypsum wallboard panels is secured to the at least one resilient strip to form a ceiling, each gypsum wallboard panel used to create the ceiling having a weight of approximately and preferably no more than 1800 lbs/msf, and being made from a wallboard slurry composition including less than 5% by weight of Grade 4 vermiculite. The ceiling system resists charring by fire for one hour.

DETAILED DESCRIPTION

Figure 1:
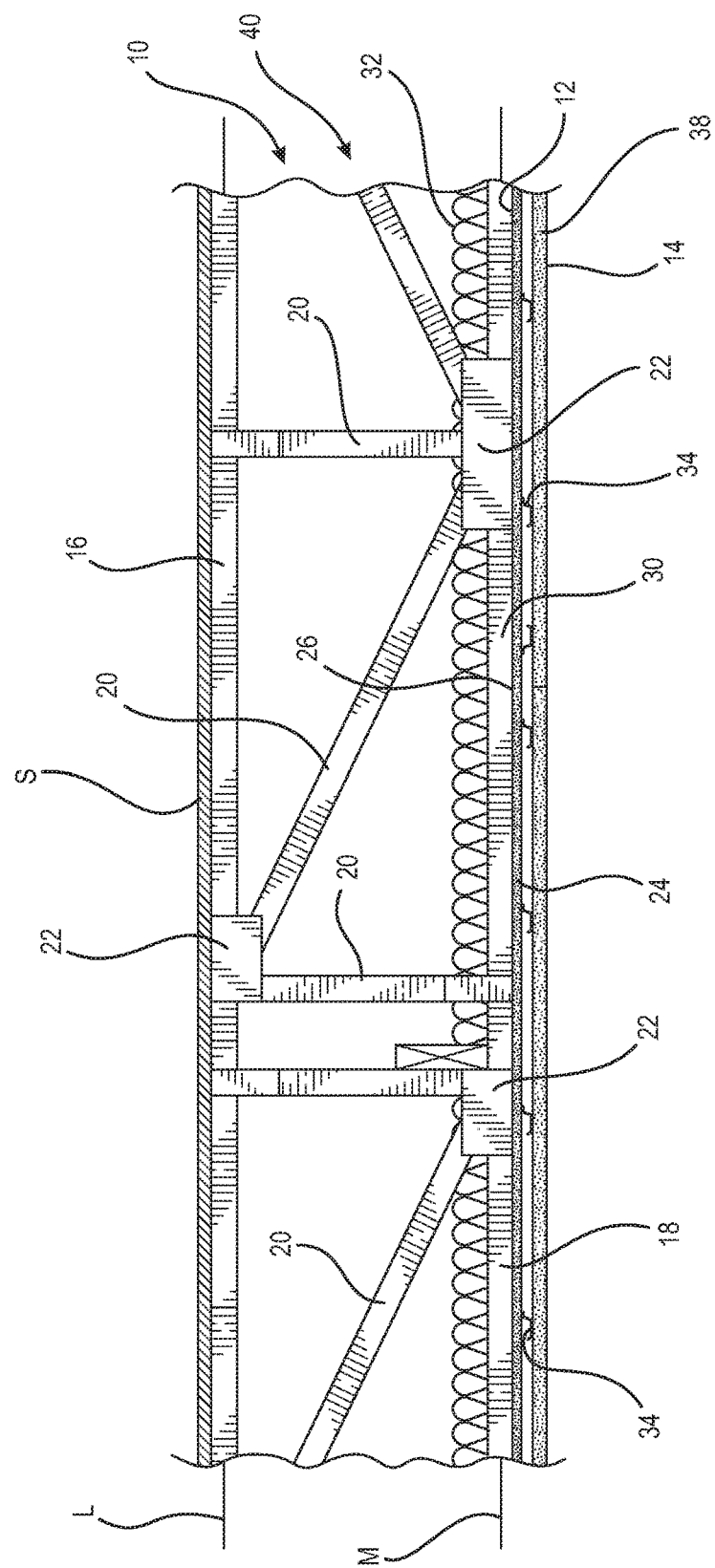
FIG. 1 is a side elevation of the present ceiling system having enhanced fire resistance and including a conventional open-web wooden truss with a batten strip and using specially formulated lightweight gypsum wallboard panels.
Figure 2:
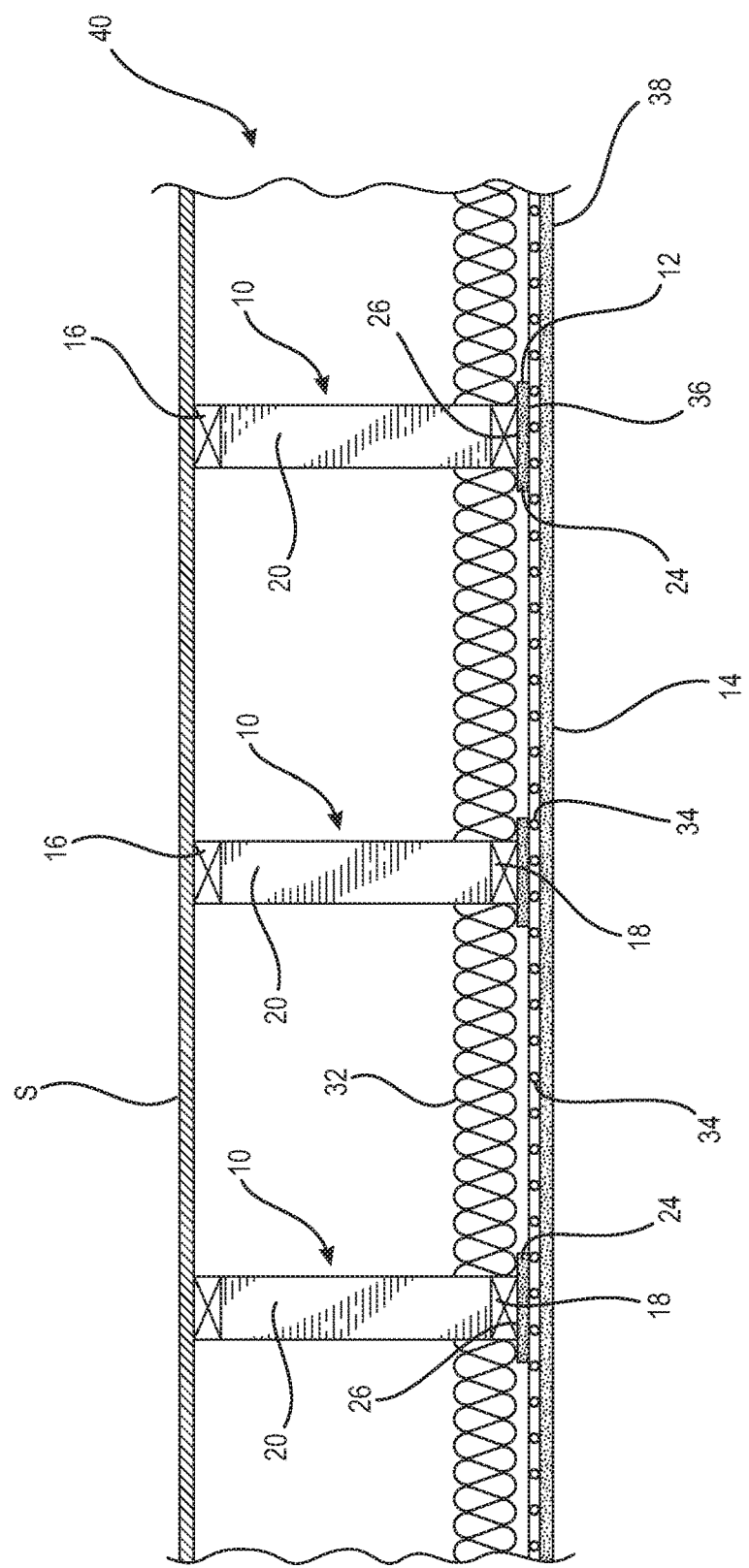
FIG. 2 is an end view of the ceiling system of FIG. 1.

Referring now to FIGS. 1 and 2, a structural support generally designated 10 is shown as an open-web wooden truss. Such supports 10 are typically used for supporting a floor of a building (here subfloor "S"), such as, but not limited to commercial buildings or residences, especially multi-story, multi-family residences. As such, in multi-story residences, the support separates two floors of the building and a lower end 12 of the support 10 supports a ceiling 14 of the lower floor. The support 10 includes an upper chord 16 extending along a longitudinal axis "L." The chord 16 is typically made of a 2×4 board commonly used in residential and commercial construction. A lower chord 18 is disposed along an axis "M", extending in a vertically spaced, generally parallel orientation to the chord 16. A plurality of strengthening members, also referred to as a wooden structure or supports 20, are located between the upper and lower chords 16, 18 and are secured to the chords. As is the case with the upper chord 16, the lower chord 18 and the supports 20 are preferably made of 2×4 lumber, however other sizes for all of these components are contemplated depending on the situation.

As is known in the art, metal gusset plates 22 are used for securing the supports 20 to the associated chords 16, 18. The plates 22 are provided with a plurality of pointed teeth (not shown) for gripping the wood, and are hammered or pressed in place during construction of the truss 10. As described above, during fire conditions, conventional trusses 10 have been known to fail, in part due to charring of the chords 16 and 18, and also to the deterioration of the gusset plates 22, which results in the supports 20 detaching from the chords, and the subsequent structural failure of the truss 10.

Referring now to FIGS. 1-4, a feature of the truss 10 is the attachment of at least one wallboard batten strip 24 to an underside 26 of the lower chord 18. Each batten strip 24 is preferably cut from a gypsum wallboard panel, having a thickness of either ½ or ⅝ inch depending on the application. In width, each batten strip 24 is approximately 6-8 inches, however the width may vary to suit the application. Each batten strip 24 is constructed and arranged so that the strip defines a ledge 28 extending from each side 30 of the lower chord 18. It is preferred that the chord 18 is generally centered upon the batten strip 24, so that the ledges 28 extending from each side 30 are relatively equal to each other. In an embodiment, the ledges 28 extend one inch from the corresponding sides 30, however it is contemplated that the distance extending from the side may vary to suit the application. Further, it is preferred that the batten strips 24 extend coextensively along a length of the lower chord 18.

An advantage of the ledges 28 is that they provide a support location for lengths or bats or strips of insulation 32, typically fiberglass, however other types of conventional ceiling insulation are contemplated. Using the present trusses 10, the strips of insulation 32 are easily installed and retained without supplemental fastening between adjacent ledges 28, facilitating the creation of a heat and sound insulating barrier.

Figure 3:
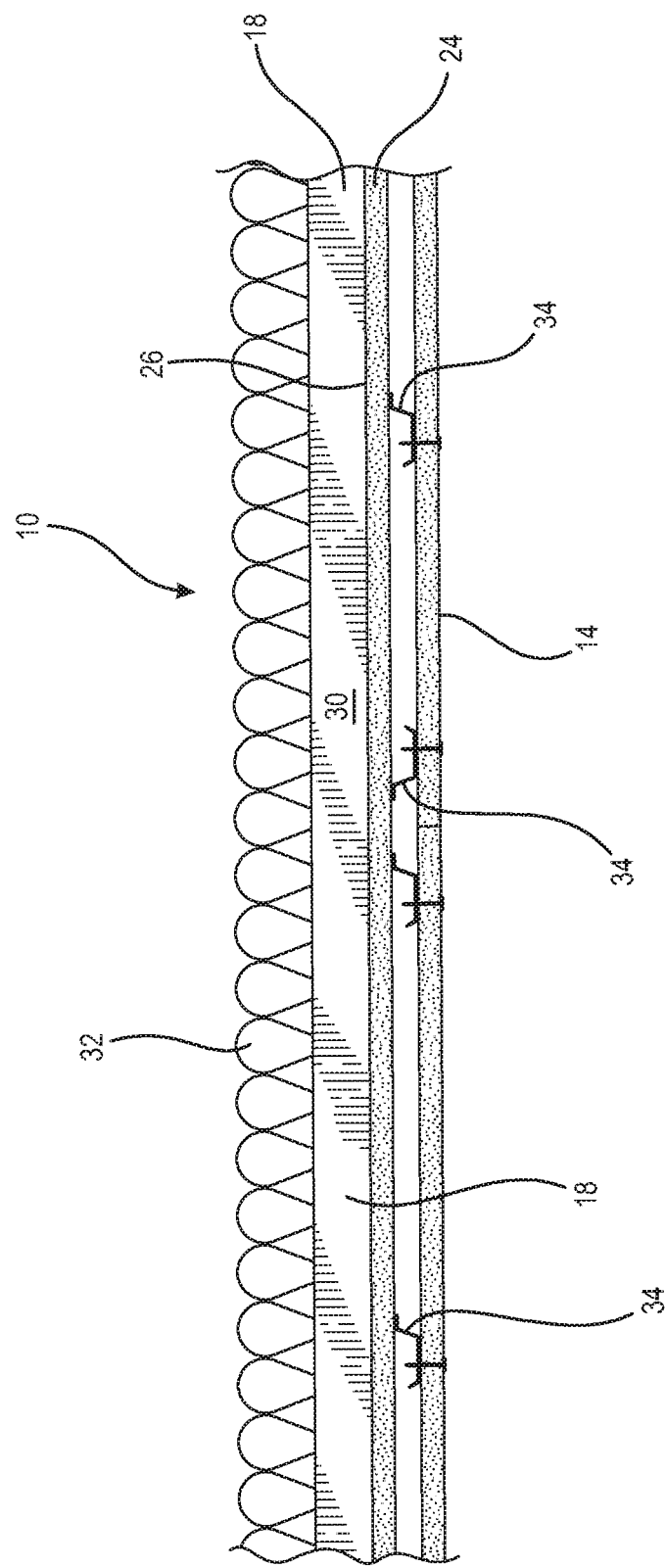
FIG. 3 is an enlarged fragmentary view of the ceiling system of FIG. 1.
Figure 4:
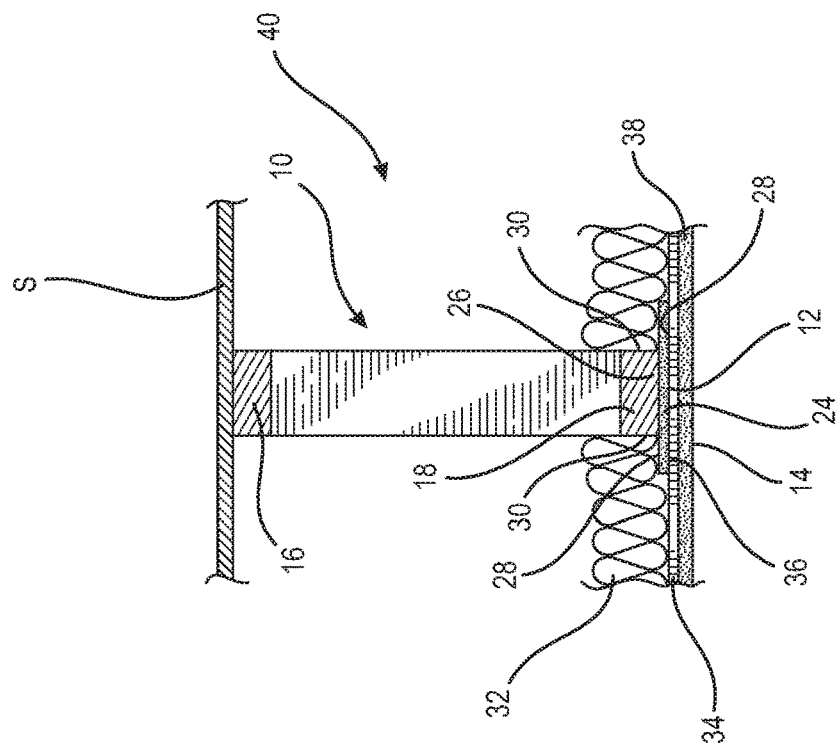
FIG. 4 is an end view of a single open-web wooden truss in the present ceiling system using the present lightweight gypsum wallboard panels.

Referring now to FIGS. 2 and 3, beneath the batten strips 24 are attached a plurality of spaced, parallel resilient acoustical decoupling channels 34. The resilient channels 34, typically made of formed metal, are fastened to an underside 36 of the batten strips 24 using threaded fasteners or the like, as is known in the art, and extend in a direction that is normal to the longitudinal axes "L" and "M".

Referring now to FIGS. 1-4, a single wallboard ceiling panel 38 is secured to the at least one resilient channels 34. Since the panels 38 are fastened to the resilient channels and not to the trusses 10, they are acoustically decoupled from the trusses, and provide a quieter environment for the living space below the ceiling system, generally designated 40, and including the support 10, the batten strip 24, the resilient channels 34 and the panels 38.

A feature of the present ceiling assembly is that the panels 38, as well as the batten strip 24 are made generally according to commonly-assigned U.S. Pat. No. 8,702,881, incorporated by reference. Gypsum panels used in building and other construction applications (such as a gypsum wallboard or ceiling panels) typically include a gypsum core with cover sheets of paper, fiberglass or other suitable materials. Gypsum panels typically are manufactured by mixing calcined gypsum, or "stucco," with water and other ingredients to prepare a slurry that is used to form the core of the panels. As generally understood in the art, stucco comprises predominately one or more forms of calcined gypsum, i.e. gypsum subjected to dehydration (typically by heating) to form anhydrous gypsum or hemihydrate gypsum ($CaSO_4.1/2H_2O$). The calcined gypsum may include beta calcium sulfate hemihydrate, alpha calcium sulfate hemihydrate, water-soluble calcium sulfate anhydrite, or mixtures of any or all of these, from natural or synthetic sources. When introduced into the slurry, the calcined gypsum begins a hydration process which is completed during the formation of the gypsum panels. This hydration process, when properly completed, yields a generally continuous crystalline matrix of set gypsum dihydrate in various crystalline forms (i.e. forms of $CaSO_4.2H_2O$).

In the '881 patent, a set gypsum core composition for a nominal ⅝-inch fire-rated panel is provided using gypsum-containing slurry including at least water, stucco, and high expansion vermiculite. In one such embodiment, the set gypsum core has a density of from about 30 pounds per cubic foot (pcf) to about 40 pcf, and the core comprises stucco in an amount from about 1162 lbs/msf to about 1565 lbs/msf, high expansion vermiculite from about 5% to about 10% by weight of the stucco, and mineral or glass fiber from about 0.3% to about 0.9% by weight of the stucco. (Unless otherwise stated, the percentages of the component of the gypsum core are stated by weight based on the weight of the stucco used to prepare the core slurry). In another embodiment, the set gypsum core has a density of from about 30 pcf to about 40 pcf, and the core comprises stucco in an amount from about 1162 lbs/msf to about 1565 lbs/msf, high expansion vermiculite from about 5% to about 10% by weight of the stucco, starch from about 0.3% to about 3% by weight of the stucco, mineral or glass fiber from about 0.3% to about 0.9% by weight of the stucco, and phosphate from about 0.03% to about 0.4% by weight of the stucco. The resulting panel has a weight in the range of 1500-1700 lbs/msf.

In the '881 patent, the concept of the expansion of vermiculite in wallboard panels upon exposure to fire is discussed in detail. However, the application there focused on wall panels, which are obviously supported by gravity along a lower edge. The attendant expansion due to the vermiculite assists in retarding the destructive effects of fire to counter the shrinkage of conventional wallboard upon exposure to fire is considered a benefit.

However, it was found that when relatively lightweight wallboard panels made in strict accordance with the '881 patent, having a weight of approximately, and preferably no more than 1800 lbs/msf based on the weight of the stucco were used in a ceiling application, upon exposure to fire, the panels expanded excessively to the extent that the panels became detached from the ceiling and thus permitted unwanted premature access by the fire to the supporting structure during fire tests per UL/263/ASTM E119. As discussed above, the weight percentage of the vermiculite in the '881 patent was in the range of 5-10%.

Accordingly, a feature of the present panel is based on the discovery that when the weight percentage of Grade 4 vermiculite was reduced to less than 5%, during a fire test, there is sufficient expansion of the ceiling panels to tighten and close the inter-panel gaps, but the expansion is not severe to the extent that the panels detach from the ceiling. It is preferable that the weight percent of the Grade 4 vermiculite not exceed 4% based on the weight of the stucco. It is also preferable that that the weight percent of the Grade 4 vermiculite not exceed 3% based on the weight of the stucco.

Thus, the present panels 38 and the batten strip 24 are formulated with Grade 4 vermiculite at weight percentage of less than 5% by weight of the stucco. In other words, the preferred vermiculite is provided at a weight rate of 50 lbs/msf. The Grade 4 vermiculite has a 300% expansion coefficient. It is especially preferred that the panels 38 are formulated with Grade 4 vermiculite at a weight percentage of less than 4%. It is especially preferred that the panels 38 are formulated with Grade 4 vermiculite at a weight percentage of 3.57%. It is especially preferred that the panels 38 are formulated with Grade 4 vermiculite at a weight percentage of less than 3%. Also, the panels 38 are ⅝ inch thick. Due to the controlled expansion of the panels 38, which close inter-panel gaps which inhibit the progression of fire-induced heat, and the extra layer of protection provided to the support 10 by the batten strip 24, which protects the support, and especially the lower chord 18 from fire damage, the present ceiling system 40 has been found to meet the one-hour fire test per UL/263/ASTM E119, despite the fact that the panels 38 are made of relatively lightweight board, having a weight of approximately 1800 lbs/msf based on the weight of the stucco.

Tests of the present ceiling system 40 per UL/263/ASTM E119 including the truss 10 have shown that the system withstands fire for at least one hour.

Figure 5:
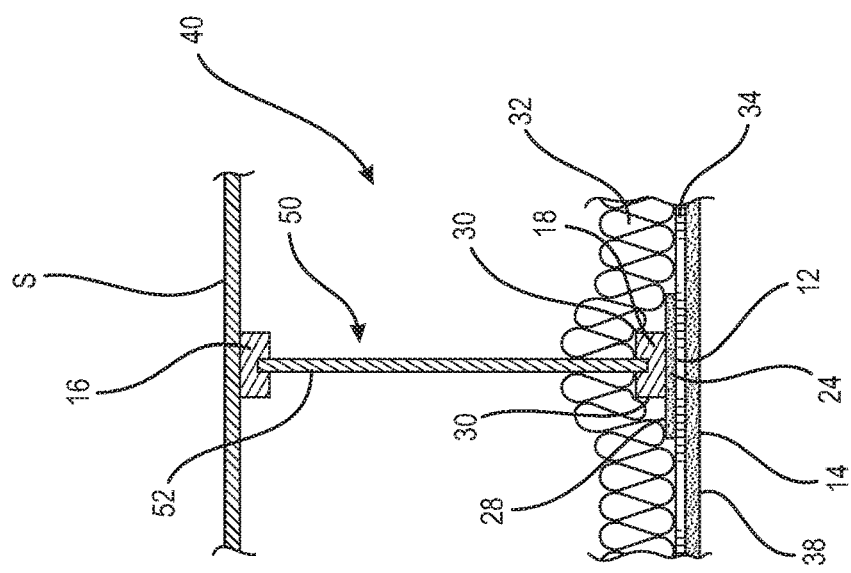
FIG. 5 is an end view of an alternate embodiment of the present ceiling system where the open-web wooden truss is replaced with a wooden "I"-joist.

Referring now to FIG. 5, an alternate to the support 10 is generally designated 50. Shared components with the support 10 are designated with identical reference numbers. A main difference between the supports 10 and 50 is that the latter is a wooden "I"-joist, as is presently known in the art, and includes upper and lower chords 16, 18 joined together by a wooden structure 52, which is a wooden web, typically made of engineered wood, including wood chips or fibers supported by a binder or resin as is known in the art.

While a particular embodiment of the present one-hour fire rated wooden frame members using lightweight gypsum wallboard has been shown and described, it will be appreciated by those skilled in the art that changes and modifications may be made thereto without departing from the invention in its broader aspects and as set forth in the following claims.

What is claimed:

1. A plurality of wooden frame supports configured for use in a ceiling system having a plurality of said supports mounted in spaced parallel relation to each other, each of said supports comprising:
   an upper wooden chord extending along a longitudinal axis;
   a lower wooden chord disposed below the upper chord, said lower chord has two sides and an underside, and extending along an axis vertically displaced and parallel relative to said longitudinal axis, a wooden structure connecting said lower chord to said upper chord; and
   at least one gypsum wallboard batten strip attached directly to said underside of said lower chord, said batten strip being dimensioned to have a width in a range of 6-8 inches to define a ledge extending from each said side of said lower chord, such that a space is defined between ledges of adjacent supports of said plurality of supports;
   the ceiling system including a single thickness of gypsum wallboard panels forming a ceiling attached to said plurality of supports, said batten strip being a separate component from the single thickness of gypsum wallboard panels;
   each of said gypsum wallboard panels forming said ceiling being made from a wallboard slurry composition including less than 5% by weight of vermiculite; and
   wherein said plurality of supports are assembled in the ceiling system with each of said plurality of supports having lengths of insulation supported by said ledges formed by said gypsum wallboard batten strips of the adjacent supports, said ceiling system resists charring by fire for one hour per UL 263/ASTM E119.

2. The plurality of wooden frame supports of claim 1, wherein each of said supports is an open web wooden truss having a plurality of wooden chord supports attached between said upper and lower chords, and a plurality of metal gusset plates securing said chord supports to said upper and lower chords.

3. The plurality of wooden frame supports of claim 1, wherein each of said plurality of supports is a wooden "I"-beam.

4. The plurality of wooden frame supports of claim 1, wherein said vermiculite is Grade 4 vermiculite and is provided in a weight percent of less than 5% of the wallboard slurry composition.

5. The plurality of wooden frame supports of claim 1, wherein said wallboard panel has a weight of approximately 1,800 pounds per thousand square feet.

6. The plurality of wooden frame supports of claim 1 wherein said ledge extends at least one inch from each said side of said lower chord.

7. The plurality of wooden frame supports of claim 1, wherein said batten strips extend along a length of said lower chord, and are coextensive with said lower chord.

8. The plurality of wooden frame supports of claim 1, wherein said batten strips are secured to said lower chord so that said lower chord is generally centered relative to said batten strips, such that said batten strips extend laterally generally equally from each said side of said lower chord.

9. A ceiling system, comprising:
   a plurality of wooden frame trusses, each of said trusses including:
   an upper wooden chord extending along a longitudinal axis;
   a lower wooden chord disposed below the upper chord, said lower chord having two sides and an underside, and extending along an axis vertically displaced and parallel relative to said longitudinal axis, a plurality of wooden supports attached between said upper and lower chords;
   a plurality of metal gusset plates securing said supports to said upper and lower chords;
   at least one gypsum wallboard batten strip attached directly to said underside of said lower chord, each said gypsum wallboard batten strip being constructed and arranged so that said gypsum wallboard batten strip defines a ledge extending from each said side of said lower chord;
   at least one length of insulation inserted between adjacent trusses of said plurality of trusses, being placed upon and supported by said ledges such that said length of insulation extends between said adjacent trusses;
   at least one resilient strip secured to an underside of each said wallboard batten strip; and
   a single layer of gypsum wallboard panels secured to said at least one resilient strip and forming a ceiling, each said gypsum wallboard panel forming said ceiling having a weight of 1,800 pounds per thousand square feet, and being made from a wallboard slurry composition including less than 5% by weight of vermiculite; and
   said ceiling system resists charring by fire for one hour per UL263/ASTM E119.

10. The ceiling system of claim 9, wherein said ledges extend generally equally from each said side of said lower chord.

11. The ceiling system of claim 9, wherein said ledges extend approximately one inch from each said side of said lower chord.

12. The ceiling system of claim 9, wherein each said batten strip has a width in –a range of 6-8 inches.

* * * * *